(12) United States Patent
Kashiwagi et al.

(10) Patent No.: US 8,287,682 B2
(45) Date of Patent: Oct. 16, 2012

(54) PROCESS FOR PRODUCTION OF RESIN COMPOSITE MOLDED ARTICLE

(75) Inventors: Motofumi Kashiwagi, Tokyo (JP); Koutaro Hata, Sano (JP)

(73) Assignee: ZEON Corporation, Tokyo (JP)

( * ) Notice: Subject to any disclaimer, the term of this patent is extended or adjusted under 35 U.S.C. 154(b) by 733 days.

(21) Appl. No.: 12/225,664

(22) PCT Filed: Mar. 28, 2007

(86) PCT No.: PCT/JP2007/056593
§ 371 (c)(1), (2), (4) Date: Nov. 20, 2008

(87) PCT Pub. No.: WO2007/119552
PCT Pub. Date: Oct. 25, 2007

(65) Prior Publication Data
US 2009/0250163 A1    Oct. 8, 2009

(30) Foreign Application Priority Data
Mar. 29, 2006   (JP) .................................. 2006-91825

(51) Int. Cl.
*B32B 37/02*   (2006.01)
(52) U.S. Cl. .................................. 156/272.6; 156/273.3
(58) Field of Classification Search ............... 156/272.2, 156/272.6, 273.3, 308.6, 308.8, 309.3
See application file for complete search history.

(56) References Cited

U.S. PATENT DOCUMENTS

| | | | |
|---|---|---|---|
| 5,879,757 A * | 3/1999 | Gutowski et al. | 427/491 |
| 2004/0084402 A1 * | 5/2004 | Ashmead et al. | 216/27 |
| 2004/0112518 A1 * | 6/2004 | Rossier et al. | 156/272.2 |
| 2006/0167190 A1 * | 7/2006 | Trabesinger et al. | 525/457 |

FOREIGN PATENT DOCUMENTS

| | | |
|---|---|---|
| JP | 61-2738 A | 1/1986 |
| JP | 3-95235 A | 4/1991 |
| JP | 6-340849 A | 12/1994 |
| JP | 7-90228 A | 4/1995 |
| JP | 7-138332 A | 5/1995 |
| JP | 2004-536168 A | 12/2004 |
| JP | 2005-74796 A | 3/2005 |
| JP | 2005-77218 A | 3/2005 |
| JP | 2005-77239 A | 3/2005 |
| JP | 2005-80569 A | 3/2005 |
| WO | WO 2004007585 A1 * | 1/2004 |

* cited by examiner

*Primary Examiner* — Daniel McNally
(74) *Attorney, Agent, or Firm* — Birch, Stewart, Kolasch & Birch, LLP

(57) ABSTRACT

The present invention relates to a process for producing a resin composite molded article comprising bonding a molded article (A) of a resin A which contains a polymer containing an alicyclic structure and a molded article (B) of a resin B to produce a resin composite molded article, the bonding including a step 1 of applying at least one activation treatment selected from plasma application, excimer ultraviolet irradiation, and corona discharge to the bonding surface of the molded article (A), followed by a treatment with a silane coupling agent (A), a step 2 of applying at least one activation treatment selected from plasma application, excimer ultraviolet irradiation, and corona discharge to the bonding surface of the molded article (B), and a step 3 of superposing the bonding surface of the molded article (A) on the bonding surface of the molded article (B), and press-bonding the bonding surfaces. According to the present invention, a resin composite molded article having excellent peeling resistance can be produced by bonding the molded article of the resin A which contains a polymer containing an alicyclic structure and the molded article of the resin B at a temperature below the glass transition temperature of the resins without using an adhesive.

9 Claims, 1 Drawing Sheet

(a) 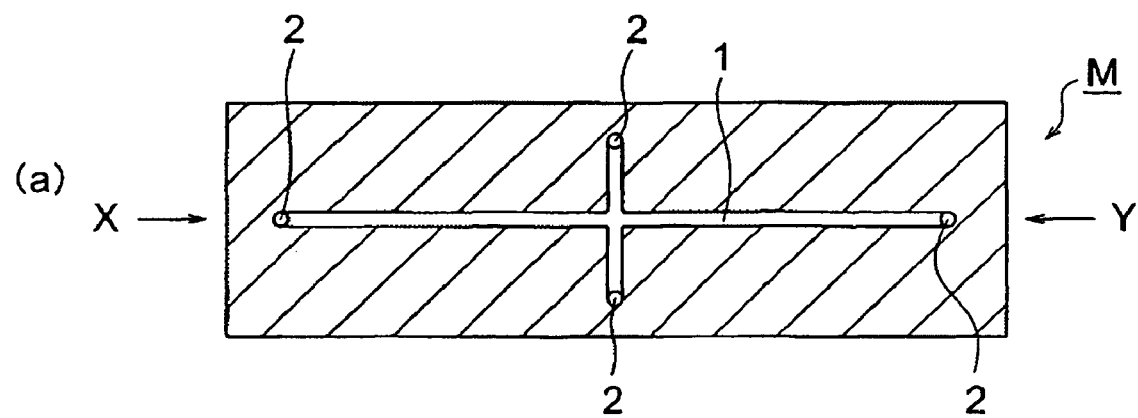
(b) 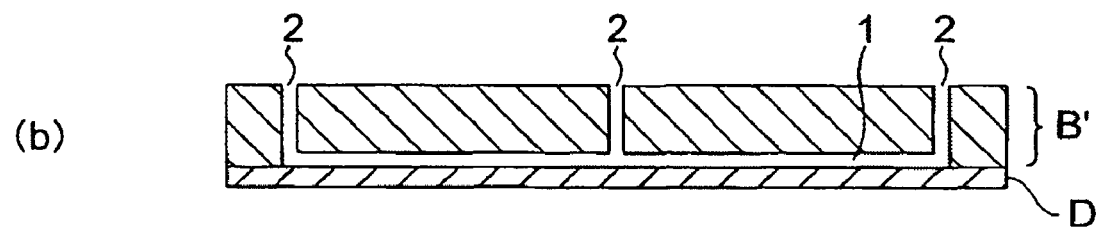

PROCESS FOR PRODUCTION OF RESIN COMPOSITE MOLDED ARTICLE

TECHNICAL FIELD

The present invention relates to a process for producing a resin composite molded article having excellent bonding strength comprising bonding a molded article of a resin A which contains a polymer with an alicyclic structure and a molded article of a resin B, without using an adhesive.

BACKGROUND ART

In recent years, a chemical reaction and a separation system using ultra-fine processing technology which is called a micro reactor or a micro analysis system have been developed. Application of such a chemical reaction and a separation system to analysis and synthesis of a nucleic acid, protein, and the like, rapid analysis of traces of chemical compounds, and high throughput screening of medical supplies and drugs on a microchip with a fine flow channel is expected.

Generally, a microchip with microchannels is prepared by bonding two molded articles, at least one of the molded articles having micropits.

For example, Patent Document 1 discloses a technology of bonding a molded article made from a specific cyclic olefin resin with a molded article made from another resin using an adhesive by applying plasma to the surface of the former molded article before bonding.

However, when the method disclosed in this document is used, the adhesive may ooze from the interface and may pollute microchannels of a microchip and the like.

Patent Document 2 discloses a method of bonding a microchip body having microchannels on the surface with a lid having a flat surface adhering securely to the microchip body by superposing the microchip body on the lid and heating under pressure to cause the resin to become fused.

However, since the method disclosed in this document causes a resin to become fused by heating under pressure, flatness of the interface may be impaired and the microchannels may lose their uniform shape or may be closed due to deformation of the resin.

Patent Document 3 discloses a method of bonding a first microchip substrate having a microchannel provided on its surface and a second microchip substrate having a surface brought closely into contact with that surface with the microchannel of the first microchip substrate by ultrasonic welding.

However, since the method uses ultrasonic vibration, microchips may not be sufficiently fused or are bonded only inadequately depending on the materials or shape of the objects to be bonded.

Patent Document 4 discloses a method of bonding a first microchip substrate having a microchannel provided on its surface and a second microchip substrate having a surface closely brought into contact with that surface with the microchannel of the first microchip substrate by laser welding.

However, since laser beams can be applied only to spots, the method exhibits low productivity when a large area is bonded. It is difficult to apply the method to a material which does not absorb laser beams such as a polymer containing an alicyclic structure. If applied to such a material, the bonding strength is insufficient.

Patent Document 5 discloses a method of bonding a microchip body having microchannels on its surface with a lid having a flat surface adhering securely to the microchip body by coating the area having no microchannels on the surface of the microchip body with an organic solvent, superposing the microchip body on the lid, and bonding the resin by fusing.

However, since the method disclosed in this document causes a resin to become fused by dissolving the interface using an organic solvent, flatness of the interface may be impaired and the microchannels may lose their uniform shape or may be closed due to deformation of the resin.

Patent Document 1: JP-A-3-95235
Patent Document 2: JP-A-2005-77218
Patent Document 3: JP-A-2005-77239
Patent Document 4: JP-A-2005-74796
Patent Document 5: JP-A-2005-80569

DISCLOSURE OF THE INVENTION

Problems to be Solved by the Invention

Although various methods of bonding two resin substrates, at least one of which has micropits, have been proposed as mentioned above, it has been difficult to efficiently produce a resin composite molded article such as a microchip having micropits with a uniform shape and exhibiting excellent bonding strength.

The present invention has been achieved in view of the above mentioned situation of general technologies and has an object of providing a process for producing a resin composite molded article having excellent bonding strength without pollution of an adhesive or deformation due to heat fusion by bonding a molded article of a resin A which contains a polymer with an alicyclic structure and a molded article of another resin B.

Means for Solving the Problems

As a result of extensive studies in order to achieve the above object, the inventors of the present invention have found that a resin composite molded article having uniform micropits and excellent bonding strength can be produced from a resin plate having a micropit in the form of a cross in the center made from a polymer containing an alicyclic structure and a polyvinyl alcohol resin film, by applying plasma, excimer ultraviolet radiation, or corona discharge to the bonding surface of the resin plate, followed by a treatment with a silane coupling agent, applying plasma, excimer ultraviolet radiation, or corona discharge to the bonding surface of a resin film made from polyvinyl alcohol, followed by a treatment with a silane coupling agent, superposing the bonding surface of the resin plate on the bonding surface of the resin film, and press-bonding the bonding surfaces. The present invention has been achieved based on the above finding.

According to the present invention, a resin composite molded article as defined in the following (1) to (9) is provided.

(1) A process for producing a resin composite molded article comprising bonding a molded article (A) of a resin A which contains a polymer containing an alicyclic structure and a molded article (B) of a resin B to produce a resin composite molded article, the bonding including a step 1 of applying at least one activation treatment selected from plasma application, excimer ultraviolet irradiation, and corona discharge to the bonding surface of the molded article (A), followed by a treatment with a silane coupling agent (A), a step 2 of applying at least one activation treatment selected from plasma application, excimer ultraviolet irradiation, and corona discharge to the bonding surface of the molded article (B), and a step 3 of superposing the bonding surface of the molded article (A) on the bonding surface of the molded article (B), and press-bonding the bonding surfaces.

(2) The process according to (1), wherein the step 2 of the activation treatment is followed by a treatment with a silane coupling agent (B).

(3) The process according to (2), wherein the silane coupling agent (B) has a functional group which reacts with the silane coupling agent (A) to form a bond.

(4) The process according to any one of (1) to (3), wherein the activation treatment in the step 1 is plasma application under normal pressure.

(5) The process according to any one of (1) to (4), wherein the activation treatment in the step 2 is plasma application under normal pressure.

(6) The process according to any one of (1) to (5), wherein the resin B contains a polymer containing an alicyclic structure.

(7) The process according to any one of (1) to (6), wherein the press bonding is carried out at a temperature below the glass transition temperature of the resin A.

(8) The process according to any one of (1) to (7), wherein at least one of the molded article (A) and the molded article (B) has a micropit and the resin composite molded article has a space formed by the micropit and the other of the molded article (A) and the molded article (B).

(9) The process according to (8), wherein the resin composite molded article is a microchip.

Effect of the Invention

According to the present invention, a resin composite molded article with excellent bonding strength can be produced without using an adhesive.

According to the present invention, a resin composite molded article having uniform and small interior vacant spaces can be efficiently produced by using a molded article (A) and a molded article (B), at least one of which has a micropit formed on the surface.

BRIEF DESCRIPTION OF THE DRAWING

FIG. 1(a) shows a plan view of the resin composite molded article having a micropit in the form of a cross obtained in Example 12, and FIG. 1(b) is a cross-sectional view of the same resin composite molded article in the X-Y direction of FIG. 1(a).

EXPLANATION OF SYMBOLS

1: Micropit (interior space), 2: Through-hole

BEST MODE FOR CARRYING OUT THE INVENTION

The present invention will be described in detail below.

The process for producing a resin composite molded article comprising bonding a molded article (A) of a resin A which contains a polymer containing an alicyclic structure and a molded article (B) of a resin B to produce a resin composite molded article, the bonding including a step 1 of applying at least one activation treatment selected from plasma application, excimer ultraviolet irradiation, and corona discharge to the bonding surface of the molded article (A), followed by a treatment with a silane coupling agent (A), a step 2 of applying at least one activation treatment selected from plasma application, excimer ultraviolet irradiation, and corona discharge to the bonding surface of the molded article (B), and a step 3 of superposing the bonding surface of the molded article (A) on the bonding surface of the molded article (B), and press-bonding the bonding surfaces.

The process of the present invention is a process for producing a resin composite molded article by bonding the molded article (A) of a resin A which contains a polymer with an alicyclic structure to the molded article (B) of a resin B.

Molded Article (A)

The molded article (A) is made from a resin A which contains a polymer having an alicyclic structure.

The polymer having an alicyclic structure contained in the resin A has a repeating unit with an alicyclic structure. Since the resin containing a polymer having an alicyclic structure has excellent transparency and contains only a small amount of components such as water and organic low molecular compounds which may be discharged from the resin, the resin is particularly suitable as a raw material for a resin composite molded article with small interior spaces of a microchip and the like.

As specific examples of the polymer having an alicyclic structure, norbornene polymers, monocyclic cycloalkene addition polymers, vinylcycloalkane polymers, and the like can be given. These polymers may be used either individually or in combination of two or more.

As the cyclic structure, a monocyclic ring, a polycyclic ring (a condensed polycyclic ring, a crosslinked ring, a polycyclic ring including these rings in combination), and the like can be given. The number of carbon atoms which make up the cyclic structure is usually 4 to 30, preferably 5 to 20, and still more preferably 5 to 15. The carbon atom number of the cyclic structure in this range ensures highly balanced characteristics such as mechanical strength, heat resistance, and formability.

The content of the repeating unit having the alicyclic structure is usually 20 to 100 wt %, and preferably 30 to 100 wt %. If the content of the repeating unit having an alicyclic structure is too small, heat resistance may deteriorate. A repeating unit other than the repeating unit having the alicyclic structure is arbitrarily selected according to the purpose of use.

Examples of the norbornene polymers include an addition polymer or a ring-opening polymer of monomers having a norbornene ring structure, or a hydrogenated product of these polymers. Examples of the addition polymers of monocycle cycloalkene include an addition polymer or a monocyclic cycloalkene monomer or an alicyclic conjugated diene monomer, or a hydrogenated product of these polymers. Examples of the vinyl cycloalkane polymer include polymers of vinyl cycloalkane or vinyl cycloalkene, a hydrogenated product of these polymers, or a nuclear hydrogenated product of an aromatic vinyl polymer. These polymers having an alicyclic structure may be copolymers of the above-mentioned monomers with other copolymerizable monomers.

The polymers having an alicyclic structure may have a polar group such as a hydroxyl group, a carboxyl group, an alkoxy group, an epoxy group, a glycidyl group, an oxycarbonyl group, a carbonyl group, an amino group, an ester group, and an acid anhydride group. However, the polymers not having a polar group are preferred.

Among these polymers having an alicyclic structure, the ring-opening polymer of monomers having a norbornene ring structure and the hydrogenated product of such a polymer are preferable because of excellent formability, excellent applicability to fluorometric analysis and the like due to small self-fluorescence and a small content of elusion components. A ring-opening polymer of monomers having a norbornene ring structure and a hydrogenated product thereof having a tertiary carbon atom in the molecule are particularly preferable due to an increased effect obtained by plasma application or excimer ultraviolet irradiation.

Although not particularly limited, the glass transition temperature of the resin A is preferably 100° C. or more, and more preferably 130° C. or more.

The polymerization method for obtaining the polymer having an alicyclic structure and the method of optional hydrogenation are not particularly limited. Known methods may be employed.

Molded Article (B)

There are no specific limitations to the resin B for forming the molded article (B) insofar as the resin can be formed into molded articles having various shapes. Specific examples of such a resin include vinyl alcohol resins such as a polyvinyl alcohol, resins containing a polymer having an alicyclic structure, chain-like polyolefin resins such as polyethylene and polypropylene, aromatic vinyl polymer resins such as polystyrene, polyamide resins such as nylon, polyester resins such as polyethylene terephthalate, polyethylene naphthalate, polycarbonate, and polyallylate, polyimide resins, and acrylic resins such as polymethyl methacrylate.

Of these, the vinyl alcohol resins and the resins containing a polymer having an alicyclic structure are preferable, the resins containing a polymer having an alicyclic structure are more preferable, and the resins containing a polymer having an alicyclic structure with a tertiary carbon atom in the molecule are particularly preferable.

The molded article (A) and the molded article (B) may contain various additives in addition to the resin A or resin B. Additives used in general resins may be used without specific limitations. As examples, a stabilizer such as an antioxidant, a thermal stabilizer, a light stabilizer, a weather stabilizer, a UV absorber, and a near-infrared ray absorber; a resin modifier such as a lubricant and a plasticizer; a coloring agent such as a dye and a pigment; an antistatic agent; and the like can be given. These additives may be used either individually or in combination of two or more. The amount of the additive may be arbitrarily determined insofar as the object of the present invention is not impaired.

The shape of the molded article (A) and the molded article (B) used in the present invention may be appropriately determined without any specific limitations according to the object of use. The shape may be a film, a sheet, a plate, a rectangular parallelepiped, a cylinder, a polygonal pillar, or the like.

The size and thickness of the molded article (A) and the molded article (B) may be appropriately determined according to the object of use without any specific limitations.

In addition, the shapes and dimensions of the molded article (A) and the molded article (B) may be the same or different insofar as the shape and dimension of the planes of the molded article (A) and the molded article (B) to be bonded are the same. Examples of such cases include the case in which both the molded article (A) and the molded article (B) are films, the case in which both the molded article (A) and the molded article (B) are sheets, the case in which the molded article (A) is a plate and the molded article (B) is a film, the case in which the molded article (A) is a film and the molded article (B) is a plate, and the like.

There are no specific limitations to the method of obtaining the molded article (A) by forming the resin A and the method of obtaining the molded article (B) by forming the resin B. Known molding methods may be used. Specific examples include injection molding, injection compression molding, press molding, extrusion molding, blow molding, vacuum molding, and the like. When forming the shape of a film, an extrusion method using a T die, a calender molding method, an inflation molding method, or a solution cast method may be used.

In the present invention, it is preferable that at least one of the molded article (A) and the molded article (B) have a micropit formed thereon. A resin composite molded article having a space formed from the micropit on the one molded article and the other molded article can be efficiently produced by using such molded articles.

The shape and size of the micropit formed on the molded article (A) and the molded article (B) may be appropriately determined according to the object of use of the resulting resin composite molded article without any specific limitations. The depth of the micropit is preferably 10 to 50 µm, and more preferably 20 to 40 µm. The width of the micropit is preferably 20 to 800 µm, and more preferably 40 to 500 µm. The surface roughness (Ra) of the micropit is preferably not more than 0.1 µm. If the size of the micropit is in the above ranges, the resulting resin composite molded article can be suitably used as a microchip. According to the present invention, the molded article having such a small micropit can be bonded without deforming or closing the micropit.

There are no specific limitations to the method of obtaining the molded article having a micropit formed therein. For example, a method of using injection molding such as a method of forming a soft steel material layer such as a layer of nickel on the inner surface of a die and cutting the soft steel material layer to form a pattern shape conforming to the target pattern, a method of forming a pattern shape conforming to the target pattern on the inner surface of a die by electrocasting, a method of forming a pattern shape conforming to the target pattern on the inner surface of a die by etching, a method of forming a pattern shape conforming to the target pattern on the inner surface of a die by sandblasting or the like, a method of using a known press embossing machine such as a flat press machine, a roll embossing machine, or the like to provide the molded article with an irregular shape of the embossing plate by heat pressing, a method of forming a pattern shape conforming to the target pattern on the molded article using a stamper, and the like can be given.

Bonding

The process for producing a resin composite molded article of the present invention comprises bonding the molded article (A) to the molded article (B), wherein the bonding includes the following steps 1 to 3.

Step 1: Applying at least one activation treatment selected from plasma application, excimer ultraviolet irradiation, and corona discharge to the bonding surface of the molded article (A), followed by a treatment with a silane coupling agent (A).

Step 2: Applying at least one activation treatment selected from plasma application, excimer ultraviolet irradiation, and corona discharge to the bonding surface of the molded article (B).

Step 3: Superposing the bonding surface of the molded article (A) on the bonding surface of the molded article (B), and press-bonding the bonding surfaces.

(Step 1)

The step 1 includes applying at least one activation treatment selected from plasma application, excimer ultraviolet irradiation, and corona discharge to the bonding surface of the molded article (A), followed by a treatment with a silane coupling agent (A).

First, at least one activation treatment selected from plasma application, excimer ultraviolet irradiation, and corona discharge is applied to the bonding surface of the molded article (A). In the present invention, plasma application, particularly normal-pressure plasma application, is more preferable due to the capability of uniformly treating the surface.

Normal-pressure plasma application is preferably carried out in an atmosphere containing at least one gas selected from hydrogen, helium, nitrogen, oxygen, and argon, more preferably in an atmosphere containing a mixture of nitrogen and dry air or oxygen. The flow rate of nitrogen is preferably 50 to 150 NL/min, and the flow rate of dry air or oxygen is preferably 0.1 to 5 NL/min. The plasma output is preferably 0.5 to 2 kW. The frequency during plasma application is preferably a resonance frequency corresponding to the output. Specifically, a frequency in the range of 10 to 100 kHz is preferable. The speed of plasma application is preferably 1 to 100 cm/min. The distance between the plasma source and the resin film is preferably 1 to 10 mm.

When plasma is applied under reduced pressure, a low pressure gas (argon gas, oxygen gas, nitrogen gas, or a mixture of these gases) at an absolute pressure of 0.001 to 10 kPa is preferably used. As a low pressure gas, a mixture of nitrogen and oxygen is particularly preferable. The mixing ratio of nitrogen and oxygen is preferably 10:1 to 1:10, and the flow rate of the mixed gas is preferably 0.1 to 10 NL/min. The output of plasma application is preferably 50 to 500 W.

Excimer ultraviolet irradiation is preferably carried out using an excimer UV lamp while passing a mixed gas of nitrogen and dry air or oxygen. The oxygen concentration of the mixed gas is usually 1 to 15%, and preferably 3 to 5%. The flow rate of the mixed gas is preferably 3 to 7 l/min.

The distance between the lamp and the bonding surface of the molded article (A) is preferably 10 mm or less, and more preferably 1 to 5 mm.

The irradiation intensity is preferably 20 to 100 mW, and more preferably 30 to 50 mW.

Corona discharge is preferably carried out in a dry air atmosphere at a dry air flow rate preferably of 10 to 100 NL/min. The corona discharge output is preferably 250 to 1000 W, and the amount of discharge is preferably 20 to 550 W·min/m$^2$.

After the activation treatment, the bonding surface is treated with the silane coupling agent (A).

A resin composite molded article having high bonding strength between the molded article (A) and the molded article (B) and having excellent water resistance can be obtained by treating the bonding surface of the molded article (A) after the activation treatment with a silane coupling agent.

Any known silane coupling agent may be used as the silane coupling agent (A).

As specific examples, silane coupling agents having a vinyl group such as vinyl trichlorosilane, vinyl trimethoxysilane, and vinyl triethoxysilane; silane coupling agents having an epoxy group such as 2-(3,4-epoxycyclohexyl)ethyltrimethoxysilane, 3-glycidoxypropyltrimethoxysilane, and 3-glycidoxypropylmethyldiethoxysilane; silane coupling agents having a styryl group such as p-styryltrimethoxysilane; silane coupling agents having a methacryloxy group such as 3-methacryloxypropylmethyldimethoxysilane, 3-methacryloxypropyltrimethoxysilane, having an epoxy group such as 2-(3,4-epoxycyclohexyl)ethyltrimethoxysilane, 3-glycidoxypropyltrimethoxysilane, and 3-glycidoxypropylmethyldiethoxysilane; silane coupling agents having a styryl group such as p-styryltrimethoxysilane; silane coupling agents having a methacryloxy group such as 3-methacryloxypropylmethyldimethoxysilane, 3-methacryloxypropyltrimethoxysilane, 3-methacryloxymethyldiethoxysilane, and 3-methacryloxytriethoxysilane; silane coupling agents having an acryloxy group such as 3-acryloxypropyltrimethoxysilane; silane coupling agents having an amino group such as N-2-aminoethyl-3-aminopropylmethyldimethoxysilane, N-2-aminoethyl-3-aminopropyltrimethoxysilane, N-2-aminoethyl-3-aminopropyltriethoxysilane, 3-aminopropyltrimethoxysilane, 3-aminopropyltriethoxysilane, 3-triethoxysilyl-N-1,3-dimethylbutylidenepropylamine, N-phenyl-3-aminopropyltrimethoxysilane, N-(vinylbenzyl)-2-aminoethyl-3-aminopropyltrimethoxysilane hydrochloride, special aminosilanes (KBM-6135, etc. manufactured by Shin-Etsu Chemical Co., Ltd.); silane coupling agents having an ureido bond such as 3-ureidopropyltriethoxysilane; silane coupling agents having a halogen atom such as 3-chloropropyltrimethoxysilane; silane coupling agents having a mercapto group such as 3-mercaptopropyltrimethoxysilane and 3-mercaptopropylmethyldimethoxysilane; silane coupling agents having a sulfide bond such as bis(triethoxysilylpropyl)tetrasulfide; silane coupling agents having an isocyanate group such as 3-isocyanatepropyltriethoxysilane; and the like can be given. These silane coupling agents may be used either individually or in combination of two or more.

As a method for treating the bonding surface of the molded article (A) after the activation treatment with the silane coupling agent (A), although a coating method of applying the silane coupling agent (A) may be used, a vapor treating method which is simple and does not require drying is preferred.

The vapor treating method is a method of causing a silane coupling agent to vaporize and allowing the molded article (A) to stand in the atmosphere of the vaporized silane coupling agent. Specifically, for example, an airtight container is filled with saturated vapor of the silane coupling agent and the molded article (A) is allowed to stand in the container. The temperature during the vapor treating is appropriately selected according to the volatility of the silane coupling agent used, usually from 10 to 40° C., and preferably from 20 to 30° C. The treating time is usually 60 to 600 seconds, and preferably 180 to 300 seconds.

(Step 2)

The step 2 includes applying at least one activation treatment selected from plasma application, excimer ultraviolet irradiation, and corona discharge to the bonding surface of the molded article (B).

As the method for applying at least one activation treatment selected from plasma application, excimer ultraviolet irradiation, and corona discharge to the bonding surface of the molded article (B), the same method of applying at least one activation treatment selected from plasma application, excimer ultraviolet irradiation, and corona discharge to the bonding surface of the molded article (A) can be given.

In the present invention, it is preferable to carry out the normal-pressure plasma application to the bonding surface at least in either one of the step 1 and the step 2.

In the present invention, treating the bonding surface of the molded article (B) with a silane coupling agent (B) after the activation treatment is preferable in order to obtain a resin composite molded article with higher bonding strength.

Although the silane coupling agents previously listed as the silane coupling agent (A) may be used as the silane coupling agent (B), a silane coupling agent having a functional group which can react and form a bond with the silane coupling agents given as the silane coupling agent used for the treatment of the molded article (A) is preferably used in order to obtain a resin composite molded article with higher bonding strength.

As preferable combinations of the silane coupling agent (A) and the silane coupling agent (B), combinations of a silane coupling agent having a group selected from an epoxy group, an acryloxy group, a methacryloxy group, and an isocyanate group and a silane coupling agent having a group selected from an amino group, an imino group, a mercapto group, and a polysulfide group are preferable.

In the present invention, a small amount of other known adhesives may be applied to the extent that the effect of the present invention is not impaired. According to the method of the present invention in which the molded article (A) and the molded article (B) can be caused to firmly adhere without using an adhesive, use of a general adhesive is unnecessary.

(Step 3)

The step 3 includes superposing the bonding surface of the molded article (A) on the bonding surface of the molded article (B), and press-bonding the bonding surfaces.

Any known method is used for superposing the bonding surface of the molded article (A) on the bonding surface of the molded article (B) and press-bonding the bonding surfaces without a specific limitation. For example, a method of superposing the bonding surface of the molded article (A) on the bonding surface of the molded article (B) and press-bonding the articles using a pressing machine such as a press laminator, a press, a vacuum laminator, a vacuum press, or a roll laminator may be given. The pressure to be applied is usually from 0.1 to 10 MPa, and preferably from 0.5 to 3 MPa. The pressing time is usually 1 to 30 minutes, and preferably 5 to 10 minutes.

Press bonding is preferably carried out with heating. Heating while pressing may further increase the adherence between the molded article (A) and the molded article (B). The temperature during press-bonding is usually 70 to 150° C., and preferably 100 to 120° C.

In the present invention, press bonding is preferably carried out at a temperature below the glass transition temperature of the resin A, and more preferably at a temperature below the glass transition temperatures of the resin A and the resin B. When the resin B contains a polymer having an alicyclic structure, the press temperature is preferably lower than the glass transition temperature of at least one of the resins, and more preferably lower than the glass transition temperatures of both resins. Deformation of the molded article (A) and the molded article (B) during press bonding may be prevented by heating in this manner. Particularly when a micropit is formed in at least one of the molded article (A) and the molded article (B), a resin composite molded article having an uniform and small interior vacant space can be obtained.

The resin composite molded article produced in this manner firmly bonds the molded article (A) and the molded article (B), which do not separate even if the resin composite molded article has been immersed in water for a long period of time.

Furthermore, when the molded article (A) and the molded article (B) having a micropit formed at least in the surface of one of the molded articles, a resin composite molded article having uniform and small interior vacant spaces can be obtained.

The resin composite molded article obtained in the above-mentioned manner may have small vents and through-holes for introducing or discharging gas and liquid. The vents and through-holes may have a cylinder bonded thereto for storing or reserving liquids (reagent, sample, buffer solution, waste fluid, etc.). A known method may be used for forming vents and through-holes without any particular limitation.

The resin composite molded article obtained in this manner may be used for various applications due to high bonding strength. For example, the resin composite molded article may be used as a medical instrument material; electric insulation material; electronic part treating instrument material; optical instrument material; electronic parts such as light receiving elements; construction materials and building materials such as windows, instrument parts, and housing; materials of vehicles such as a bumper, a rear-view mirror, a lighting fixture, a reflector, and an instrument panel; a material for electric instruments such as a speaker cone material, an oscillating element for speakers, and a microwave oven container; food containers such as a bottle, a reuse bottle, and a feeding bottle; packaging materials such as a plastic wrap; a film, a sheet, a helmet shield, and the like.

Among these, due to the possession of fine uniform inner vacant spaces, the resin composite molded article is particularly suitable for use in production of microchips having interior microchannels.

The microchip obtained by the process of the present invention is suitably used for DNA analysis and chemical analysis called immunoassay in which antibody-antigen bonds are used.

EXAMPLES

The present invention is described below in more detail by way of examples and comparative examples, which are not intended to limit the present invention. In the examples and comparative examples, "part(s)" means "part(s) by weight" and "%" means "wt %" unless otherwise indicated.

Preparation Example 1

Pellets of a polymer containing an alicyclic structure (ZEONOR 1430R manufactured by Zeon Corporation, glass transition temperature: 138° C.) were melted in a short axis extruder at 240° C. and extruded from a T-die at 240° C. to prepare a resin film with a thickness of 188 μm.

The resin film was cut into a rectangle with a width of 30 mm and a length of 150 mm, and plasma was applied to the film under normal pressure using a normal pressure plasma surface treating device (AP-T03-L, manufactured by Sekisui Chemical Co., Ltd.) at an output of 1.5 kw, a frequency of 25 kHz, a nitrogen gas flow rate of 50 L/min, and a rate of irradiation of 30 cm/min, to obtain a sample A.

Preparation Example 2

A polyvinyl alcohol film with a thickness of 12 μm (Boblon EX, manufactured by Nippon Synthetic Chemical Industry Co., Ltd.) was cut into a rectangle with a width of 30 mm and a length of 150 mm, and plasma was applied to the film under normal pressure in the same manner as in Preparation Example 1 to obtain a sample B.

Preparation Example 3

An airtight container was charged with a small amount of 3-aminopropyltriethoxysilane (KE903, manufactured by Shin-Etsu Chemical Co., Ltd.) as a silane coupling agent and saturated with vapor of the silane coupling agent. The film sample A obtained in Preparation Example 1 was put into the container and maintained at 25° C. for five minutes in a manner so that the film did not contact the surface of the silane coupling agent, thereby obtaining a film sample C treated with the silane coupling agent by a vapor treating method.

Preparation Example 4

A film sample D was obtained in the same manner as in Preparation Example 3, except for using 3-glycidoxypropyl-trimethoxysilane (KBM-403 manufactured by Shin-Etsu Chemical Co., Ltd.) instead of 3-aminopropyltriethoxysilane as the silane coupling agent.

Preparation Example 5

A film sample E was obtained in the same manner as in Preparation Example 4 except for using the film sample B instead of the film sample A.

Example 1

The side of the film sample C treated by plasma was superposed on the side of the film sample D treated by plasma. The superposed film samples were heat-pressed at a temperature of 120° C. and pressure of 0.9 MPa for five minutes using a vacuum laminator (manufactured by Meiki Co., Ltd.) to obtain a resin composite molded article.

Examples 2 to 9 and Comparative Examples 1-2 and 10-11

Resin composite molded articles were obtained in the same manner as in Example 1, except for using combinations of two film samples as shown in Table 1.
(Measurement of Peeling Resistance)
The resin composite molded articles obtained in Examples 1 to 9 and Comparative Examples 1-2 and 10-11 were cut into strips, each having a width of 10 mm and a length of 150 mm. A peeling test was carried out at a temperature of 23° C., a peel rate of 50 min/min, and a peel angle of 180° to determine the peeling resistance (N/cm). The results are shown in Table 1.
(Evaluation of Bonding Strength after Immersion in Water)
The resin composite molded articles obtained in Examples 1 to 9 and Comparative Examples 1-2 and 10-11 were immersed in water for 24 hours to determine if the molded articles had peeled off. The result was classified into "A" in which the sample did not peel off and there was no change in the bonding strength, "B" in which the sample did not peel off, but the bonding strength was slightly decreased, and "NG" in which the sample had peeled off. The evaluation results are shown in Table 1.

TABLE 1

|  |  | Combination of film samples | Peeling resistance (N/cm) | Evaluation of bonding after immersion in water |
|---|---|---|---|---|
| Example | 1 | C/D | 3.6 | A |
|  | 2 | C/E | 3.4 | A |
|  | 3 | D/E | 3.9 | A |
|  | 4 | A/C | 2.5 | B |
|  | 5 | A/D | 2.4 | B |
|  | 6 | A/E | 2.3 | B |
|  | 7 | B/C | 2.6 | B |
|  | 8 | B/D | 2.7 | B |
|  | 9 | B/E | 2.8 | B |
| Comparative | 1 | A/A | 1.0 | NG |
| Example | 2 | A/B | 2.1 | NG |
|  | 10 | C/C | 2.4 | B |
|  | 11 | D/D | 2.4 | B |

As shown in Table 1, the resin composite molded articles of Examples 1 to 9 showed peeling resistance larger than the resin composite molded articles of Comparative Examples 1 and 2, and their bonding strength was more excellent.

In addition, as compared with the resin composite molded articles of Comparative Examples 1 and 2 which had peeled off after immersion in water for 24 hours, the resin composite molded articles of Examples 1 to 9 did not peel off.

The resin composite molded articles of Examples 1 to 3 particularly maintained high peeling resistance and their bonding strength did not change at all after immersion in water for 24 hours, showing that these are the resin composite molded articles with remarkably excellent bonding strength.

Preparation Example 6

Pellets of a polymer containing an alicyclic structure (ZEONOR 1430R manufactured by Zeon Corporation) were injection molded at a rein temperature of 330° C., a die temperature of 130° C., and injection pressure of 180 MPa to prepare a resin board with a width of 30 mm, a length of 85 mm, and a thickness of 1 mm. A cross pit with a width of 50 μm and a depth of 30 μm was formed in the center of the resin board by embossing. The length of the cross pit was 20 mm in the width direction of the board and 70 mm in the length direction of the board. The other side of the resin board on which the cross pit was not formed was treated by plasma under atmospheric pressure in the same manner as in Preparation Example 1 to obtain a resin board sample A.

Preparation Example 7

A resin board sample B with a surface treated with a silane coupling agent was obtained in the same manner as in Preparation Example 3 except for using the resin board sample B instead of the film sample A.

Example 12

A part of the film sample D was cut to obtain a rectangle with a width of 30 mm and a length of 85 mm. Next, through-holes, each having a diameter of 50 μm, were produced at four end points of the pit on the resin board sample B to prepare a resin board sample B'. The side of the resin board sample B' treated by plasma was superposed on the side of the film sample D treated by plasma. The superposed film samples were heat-pressed at a temperature of 120° C. and pressure of 0.9 MPa for five minutes using a vacuum laminator (manufactured by Meiki Co., Ltd.) to obtain a resin composite molded article M, which is a microchip having a cross channel (inner vacant space). The obtained resin composite molded article M is shown in FIG. 1, in which FIG. 1(a) shows a plan view of the resin composite molded article M and FIG. 1(b) shows a cross-sectional view of the resin composite molded article M in the X-Y direction. The resin composite molded article M shown in FIG. 1 has a cross channel 1 having a width of 50 μm and a depth of 30 μm and through-holes 2 at four ends of the channel 1.

The peeling resistance of the resin composite molded article M was measured by the following method to confirm that the peeling resistance was 3.0; N/cm. The resin composite molded article M was immersed in water for 24 hours to determine if the molded articles had peeled off. There was no peeling found. In addition, the resin composite molded article M was confirmed to have a uniform cross micropit as a result of visual observation.

Comparative Example 3

A resin composite molded article was obtained in the same manner as in Example 12 except for using a resin board sample A instead of the resin board sample B. The peeling resistance of the resin composite molded article was measured by the following method to confirm that the peeling resistance was 0.9; N/cm. The resin composite molded article was immersed in water for 24 hours to confirm that the film had peeled off the resin board.

(Measurement of Peeling Resistance of Film from Board)

The resin board side of the resin composite molded article obtained was secured to cut the molded article into strips, each having a width of 10 mm and a length of 85 mm. The peeling test was carried out at a temperature of 23° C., a peel rate of 50 mm/min, and a peel angle of 90° to determine the peeling resistance (N/cm).

The invention claimed is:

1. A process for producing a resin composite molded article comprising bonding a molded article (A) of a resin A which contains a polymer containing an alicyclic structure and a molded article (B) of a resin B to produce a resin composite molded article, the bonding including:
 a step 1 of applying at least one activation treatment selected from plasma application, excimer ultraviolet irradiation, and corona discharge to the bonding surface of the molded article (A), followed by a treatment with a silane coupling agent (A),
 a step 2 of applying at least one activation treatment selected from plasma application, excimer ultraviolet irradiation, and corona discharge to the bonding surface of the molded article (B), followed by a treatment with a silane coupling agent (B) having a functional group which reacts with the silane coupling agent (A) to form a bond, wherein the silane coupling agent (A) has a group selected from the group consisting of an epoxy group, a methacryloxy group, and an isocyanate group, and wherein the silane coupling agent (B) has a group selected from the group consisting of an amino group, an imino group, a mercapto group, and a polysulfide group, and
 a step 3 of superposing the bonding surface of the molded article (A) on the bonding surface of the molded article (B), and press-bonding the bonding surfaces.

2. The process according to claim 1, wherein at least one of the molded article (A) and the molded article (B) has a micro-pit, and the resin composite molded article has a space formed by the micropit and the other of the molded article (A) and the molded article (B).

3. The process according to claim 2, wherein the resin composite molded article is a microchip.

4. The process according to claim 1, wherein the activation treatment in the step 1 is plasma application under normal pressure.

5. The process according to claim 1, wherein the activation treatment in the step 2 is plasma application under normal pressure.

6. The process according to claim 1, wherein the resin B contains a polymer containing an alicyclic structure.

7. The process according to claim 1, wherein the press bonding is carried out at a temperature below the glass transition temperature of the resin A.

8. The process for producing a resin composite molded article according to claim 1, wherein the treatment with a silane coupling agent (A) in the step 1 is carried out by a vapor treating method.

9. The process for producing a resin composite molded article according to claim 1, wherein the step 3 comprises superposing the bonding surface of the molded article (A) on the bonding surface of the molded article (B), and press-bonding the bonding surfaces under a pressure of 0.5 to 3 MPa.

* * * * *